United States Patent

Ito et al.

[11] Patent Number: 5,628,611
[45] Date of Patent: May 13, 1997

[54] METALLIC WASTE DISPOSAL DEVICE FOR INDUSTRIAL MACHINERY

[75] Inventors: Yoshiyuki Ito, Sakado; Hiroshi Aoki, Kasukabe, both of Japan

[73] Assignee: Maruyama Corporation, Tokyo, Japan

[21] Appl. No.: 494,541

[22] Filed: Jun. 26, 1995

[30] Foreign Application Priority Data

Jul. 4, 1994 [JP] Japan ................................. 6-151915

[51] Int. Cl.$^6$ ........................................ B02C 1/04
[52] U.S. Cl. .................. 414/737; 414/740; 241/266; 241/101.74
[58] Field of Search ..................... 414/729, 731, 414/737, 739, 740; 241/101.72, 101.74, 264, 266

[56] References Cited

U.S. PATENT DOCUMENTS

| | | | |
|---|---|---|---|
| 2,623,774 | 12/1952 | Hubbord | 414/737 |
| 3,795,334 | 3/1974 | Ishida et al. | 414/737 |
| 3,926,316 | 12/1975 | Luttrell | 414/737 |
| 4,323,329 | 4/1982 | Chlad | 414/737 |
| 5,007,593 | 4/1991 | Berczes | 241/264 |
| 5,292,079 | 3/1994 | Zakohji | 414/740 |

FOREIGN PATENT DOCUMENTS 1131580  12/1984  U.S.S.R. ................ 414/737

Primary Examiner—Karen B. Merritt
Assistant Examiner—Gregory A. Morse
Attorney, Agent, or Firm—Rodman & Rodman

[57] ABSTRACT

A metallic waste disposal device for industrial machinery, wherein a working unit attached to the distal end of a movable arm of a construction machine is provided with a permanent magnet assembly which attracts and disposes of metallic wastes produced when tearing down a building.

5 Claims, 13 Drawing Sheets

Fig_1_

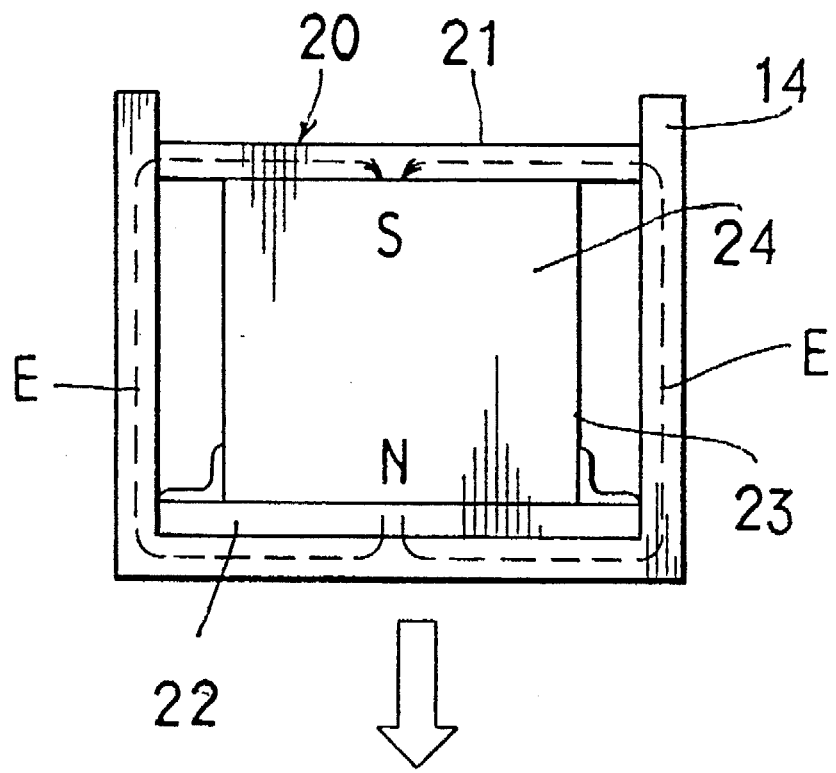
Fig_6_

Fig_7_
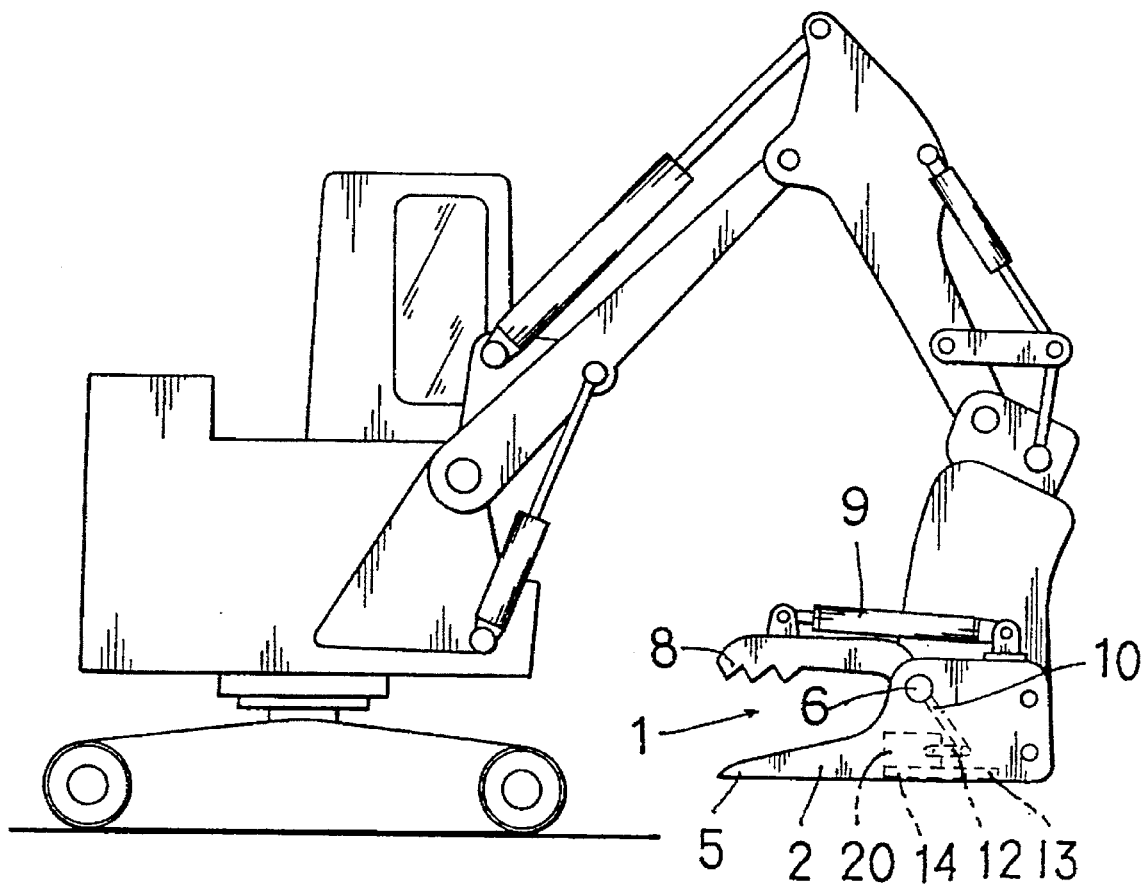

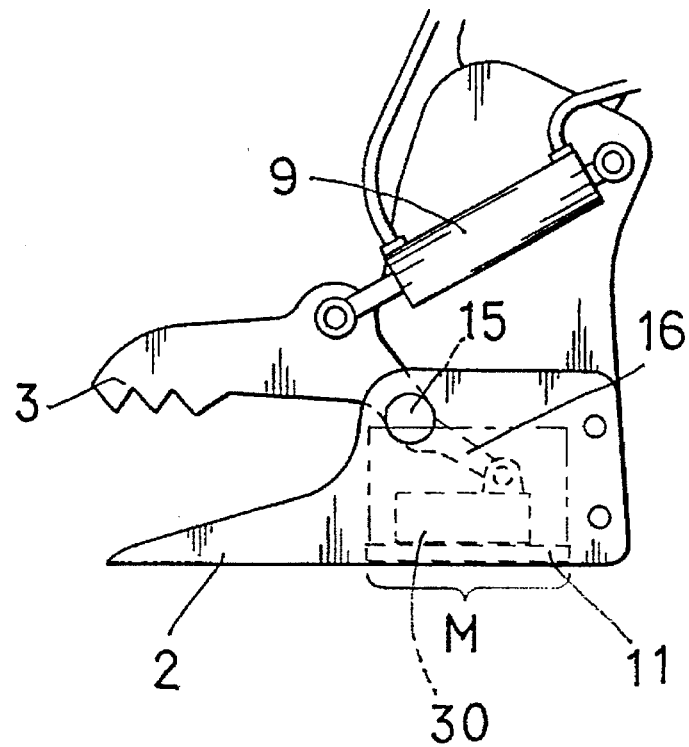
Fig_8_
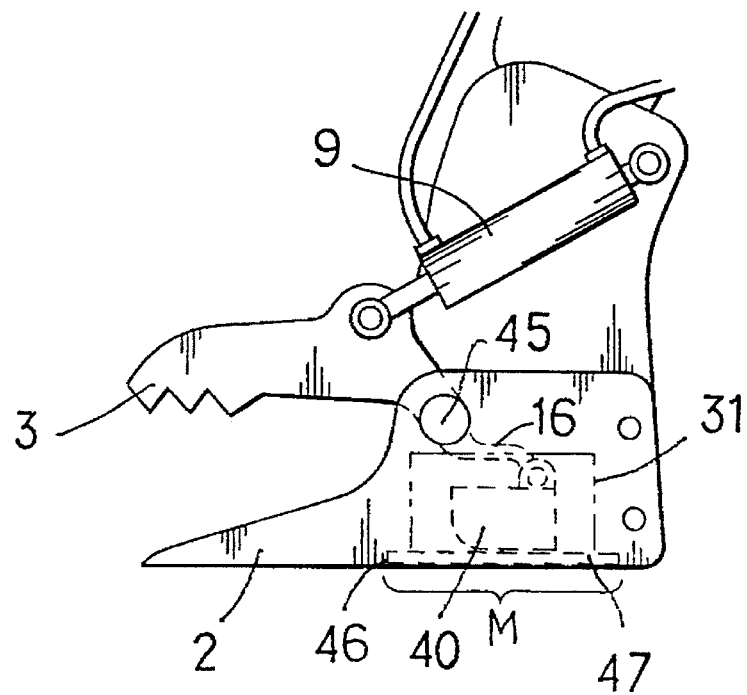
Fig_11_

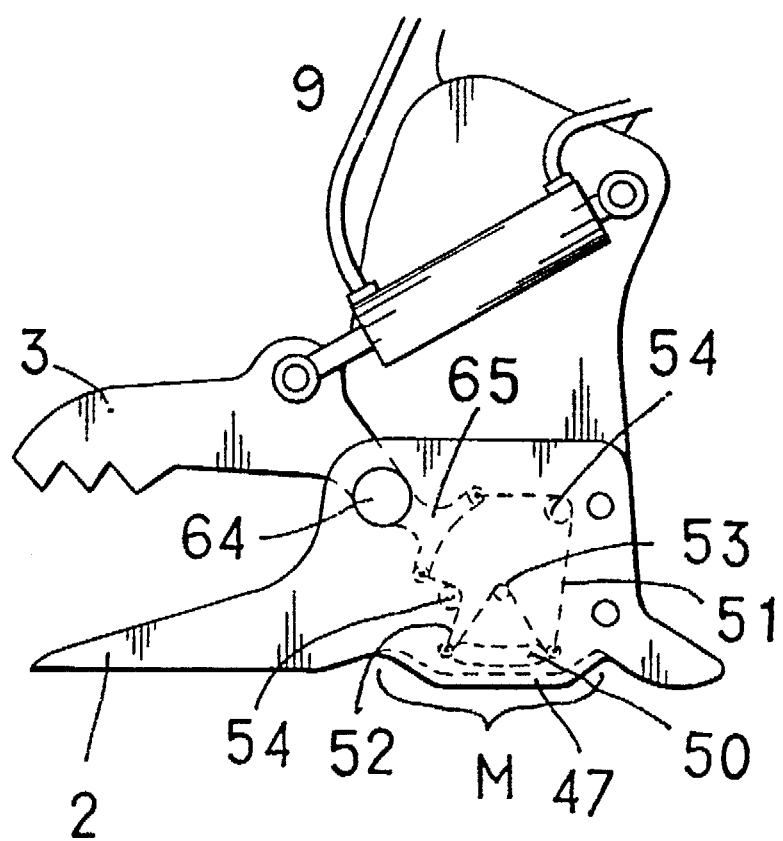

5,628,611

METALLIC WASTE DISPOSAL DEVICE FOR INDUSTRIAL MACHINERY

BACKGROUND OF THE INVENTION

1. Field of the Invention

The present invention relates to a metallic waste disposal device provided on a working unit attached to the distal end of a movable arm of earthmoving equipment, construction equipment, and other industrial machinery.

2. Description of the Related Art

There has been a device designed to attract reinforced concrete chips, which are produced when tearing down a building, by a working unit attached to the distal end of a movable arm and move them to a predetermined place. Such a conventional device, however, uses an electromagnet as the attracting means, requiring an electromagnetic operating mechanism installed in a driver's seat for turning the attracting means ON/OFF. This calls for a complicated structure and cumbersome operation that annoys a driver. Collecting a great amount of iron material contained in a building, which has been torn down, requires human power and time and it is also accompanied by danger.

SUMMARY OF THE INVENTION

Accordingly, an object of the present invention is to provide a metallic waste disposal device which allows iron materials to be easily separated and disposed of without using a dedicated power source at a field where a building is being torn down.

To this end, according to the present invention, there is provided a metallic waste disposal device in which a permanent magnet is attached to a working unit on the distal end of a movable arm mounted on industrial machinery.

BRIEF DESCRIPTION OF THE DRAWINGS

The drawings are illustrative of the embodiments of the metallic waste disposal device for industrial machinery in accordance with the present invention.

FIG. 6 is a perspective view showing the line of magnetic force observed when the metallic material has been detached from the permanent magnet assembly;

FIG. 7 is a side view showing a crusher provided with the device according to the present invention;

FIG. 8 is a side view showing a second embodiment;

FIG. 11 is a side view of a third embodiment;

FIG. 12 is a side view of a fourth embodiment;

DESCRIPTION OF THE PREFERRED EMBODIMENTS

Figure 1:
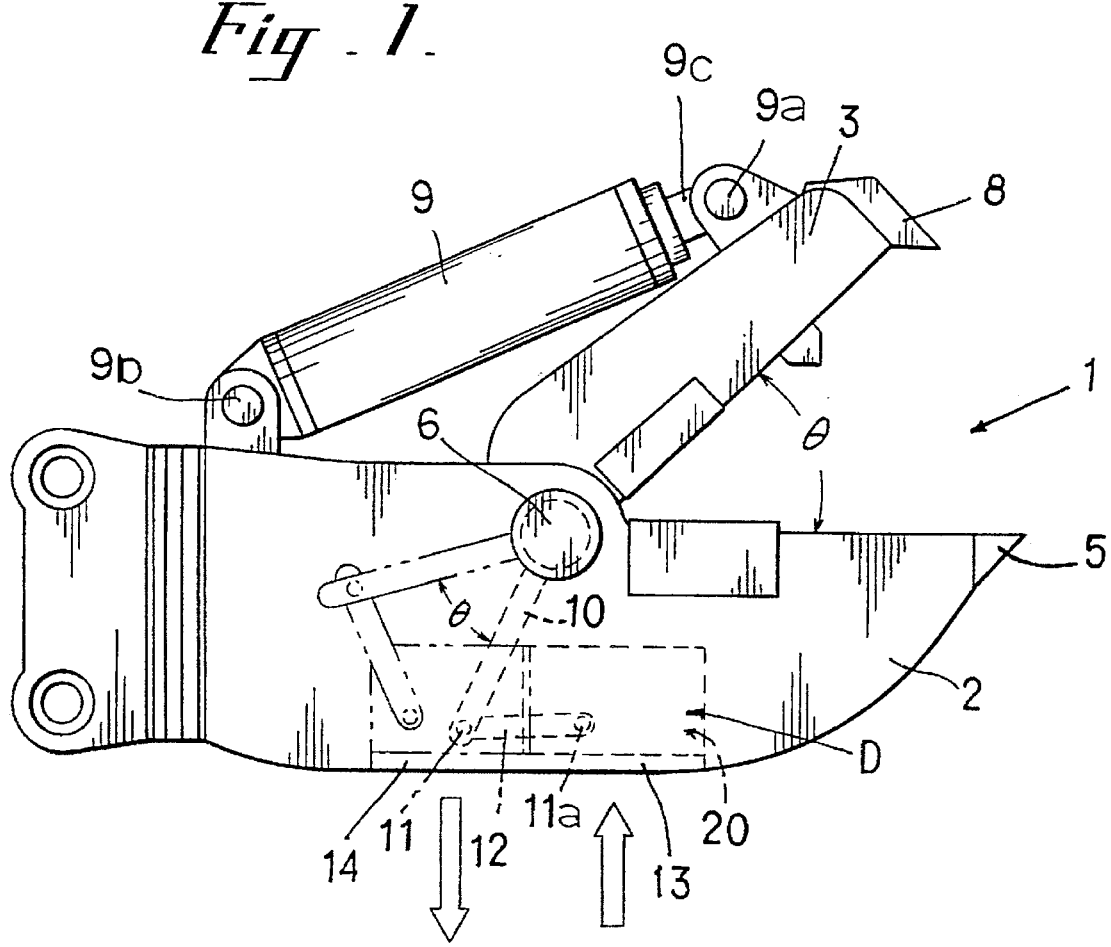
FIG. 1 is a side view of a first embodiment.

In the first embodiment shown in FIG. 1 through FIG. 7, reference numeral 1 denotes a working unit attached to the distal end of the movable arm of a crusher of construction equipment; it is constituted by a frame 2 and a crushing arm 3. The crushing arm 3 is pivotally attached to the frame 2 by a main shaft 6, a fixed blade 5 being provided on the distal end of the frame 2 and a moving blade 8 being provided on the distal end of the crushing arm 3. The frame 2 and the crushing arm 3 are connected to a hydraulic cylinder 9 by pins 9a, 9b and the crushing arm 3 opens and closes as a piston rod 9c of the hydraulic cylinder 9 expands and contracts. One side of a pair of arms 10 is fixed onto the main shaft 6 and a link 12 is pivotally attached to the free end via a connecting pin 11, the end thereof being connected to a permanent magnet assembly 20 by a pin 11a.

Figure 2:
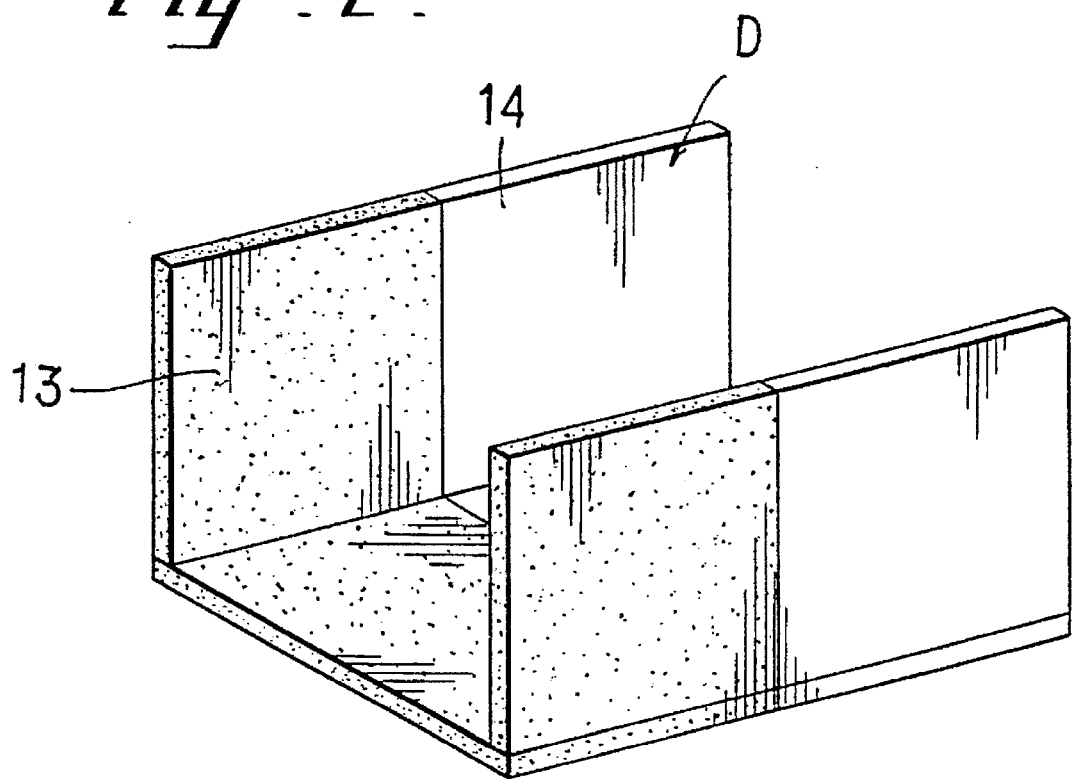
FIG. 2 is a perspective view showing a connecting frame.
Figure 3:
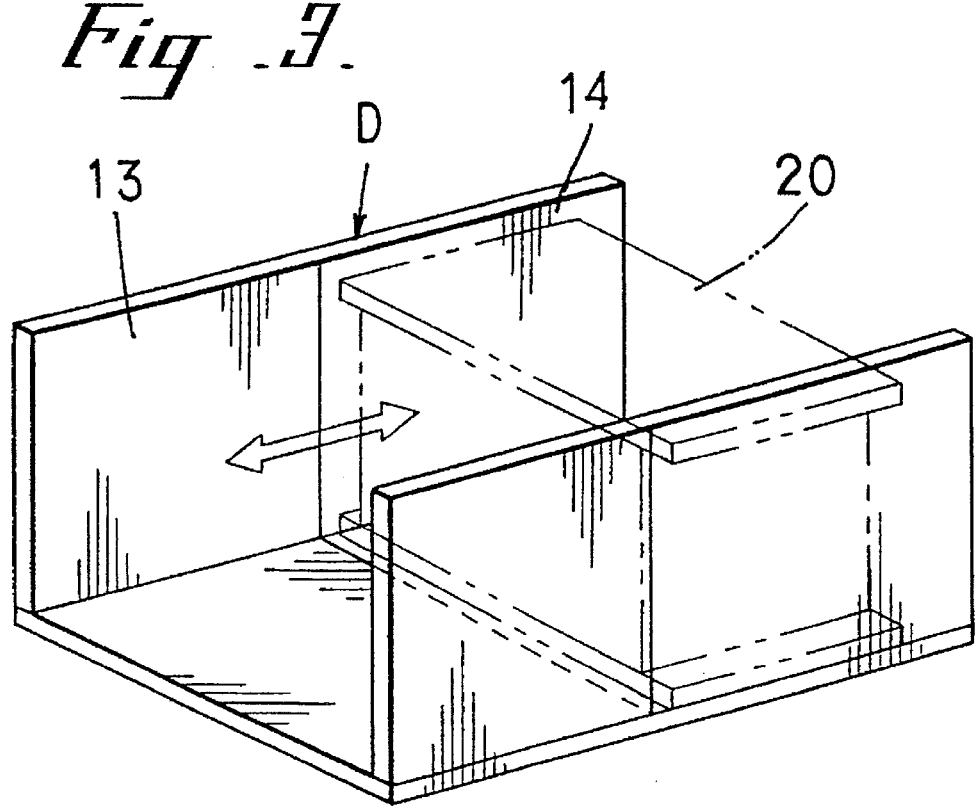
FIG. 3 is a perspective view illustrative of a permanent magnet assembly installed in the connecting frame.

Provided on the bottom surface of the frame 2 of the working unit 1 is a connecting frame D composed of a non-magnetic assembly frame 13 made of stainless steel or aluminum and an iron magnetic assembly frame 14 which are made into one piece as illustrated in FIG. 2. The permanent magnet assembly 20 is slidably installed in the connecting frame D.

Figure 4:
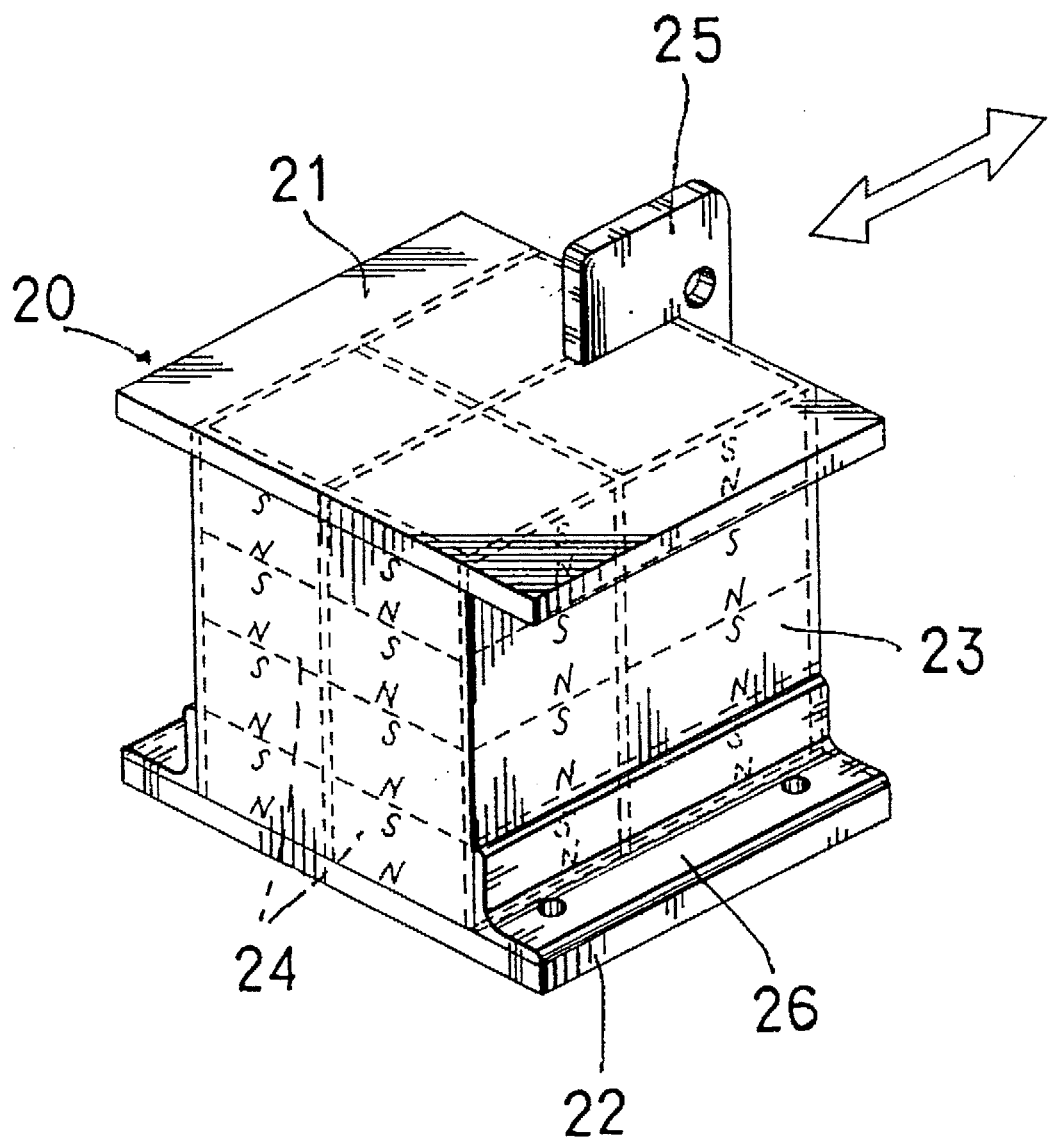
FIG. 4 is a perspective view illustrative of the permanent magnet assembly.

As shown in FIG. 4, the permanent magnetic assembly 20 has a plurality of anisotropic ferrite magnets 24 with the N pole and the S pole thereof arranged in the same direction, the ferrite magnets 24 being enclosed by iron plates 21, 22 at top and bottom and surrounded by a stainless steel square cylinder 23. A mounting seat 25 is provided on one side in the sliding direction indicated by the arrow in the drawing. A stainless steel bracket 26 is fixed to the iron plate 22 with bolts.

Figure 5:
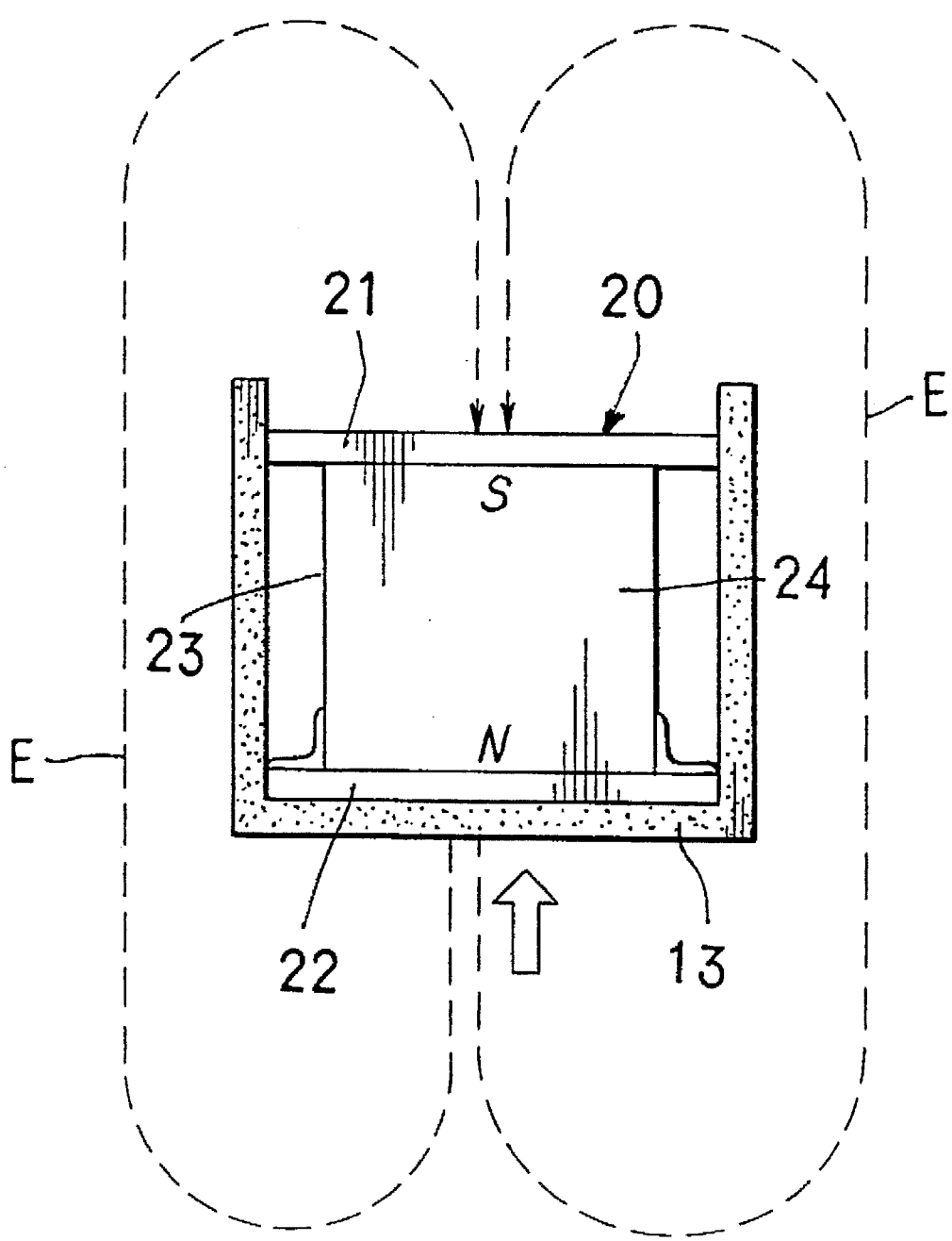
FIG. 5 is a diagram showing the line of magnetic force observed when a metallic material has been attracted.

In the structure stated above, when the hydraulic cylinder 9 is expanded to close the moving blade 8, the permanent magnet assembly 20 is housed in the non-magnetic assembly frame 13, causing a line of magnetic force E of the ferrite magnets 24 to be drawn outside (FIG. 5). Hence, a metallic object is attracted. When the moving blade 8 is opened by an angle θ by operating the hydraulic cylinder 9, the arm 10 moves to the position indicated by the chain line and the permanent magnet assembly 20 slides in the magnetic assembly frame 14. Hence, as shown in FIG. 6, the line of magnetic force E of the ferrite magnets 24 is absorbed into the magnetic assembly frame 14 and therefore it does not go out. This causes the metallic material to be released and to fall off. The operation described above is automatically carried out by the opening and closing of the moving blade 8, and no dedicated power source is required.

Figure 9:
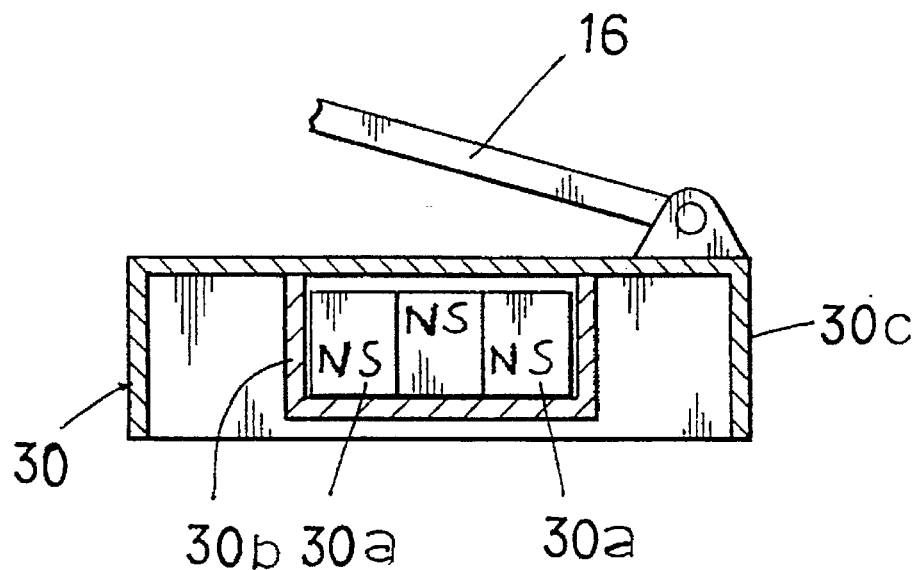
FIG. 9 is a vertical sectional side view of an attracting block assembly.
Figure 10:
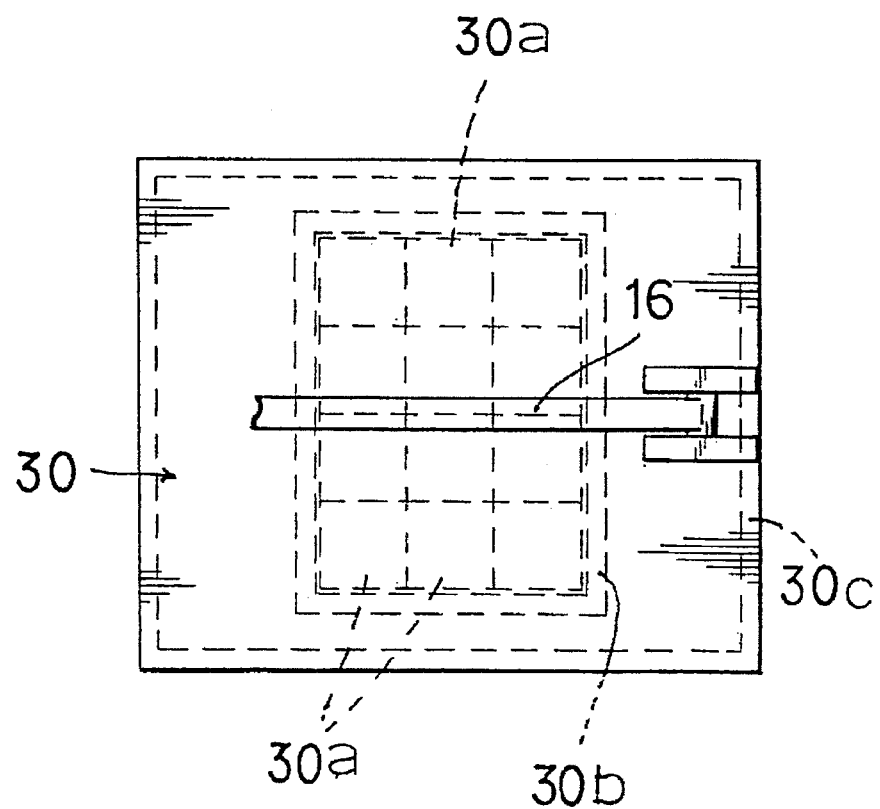
FIG. 10 is a top plan view showing permanent magnetic pieces which have been connected.

The second embodiment shown in FIG. 8 through FIG. 10 is so designed that an attracting block assembly 30 composed of a plurality of permanent magnet pieces, which are connected, is given sliding motion and circular motion in the frame 2 by the movement of the crushing arm 3, thereby detaching the attracting block assembly 30 from a magnetic absorbing area M, where a stainless steel plate (non-magnetic plate) 11 is laid, on the bottom surface of the frame. The crushing arm 3 connected to the hydraulic cylinder 9 is pivotally attached to the frame 2 by a shaft 15. An operating bar 16 is also pivotally attached with a frame plate 30c installed on the tip thereof, and a non-magnetic case 30b, which includes permanent magnet pieces 30a combined together, is provided so as to construct the attracting block assembly 30.

The embodiment shown in FIG. 11 has a permanent magnet assembly 40 connected to the distal end of the curved operating bar 16 which is pivotally attached to the shaft 45, the permanent magnet assembly 40 being located near a stainless steel plate 47 laid on the bottom 46 of the frame 2 to constitute the magnetic absorbing area M. The working bar 16 is turned by the hydraulic cylinder 9 to detach the permanent magnet assembly 40 from the magnetic absorbing area M, thereby releasing the attracted metallic material. Reference numeral 31 in the drawing denotes an enclosure of the permanent magnet unit 40.

In the embodiment shown in FIG. 12, a permanent magnet assembly 50, which is located near and above the nonmagnetic plate 47 laid on the bottom of the frame 2, is suspended by a fulcrum shaft 53. Two cords 51, 52 are connected to the right and left ends of the permanent magnet assembly 50 and the cords 51, 52 are connected to the ends of a T-shaped extension piece 65 which is made integral with the crushing arm 3 pivotally attached to the frame 2 by a shaft 64 via a guide roller 54. Thus, with the shaft 64 used as the fulcrum, the cord 51 of the two cords 51, 52 is pulled as the T-shaped extension piece 65 turns in response to the movement of the crushing arm 3, and the permanent magnet assembly 50 is turned upward around the fulcrum shaft 53 to detach it from the magnetic absorbing area M so as to release the attracted metallic material.

In the embodiment shown in FIG. 13 through FIG. 16, an outer frame 90 is provided on the top surface of a base 70 which attracts a metallic material, a pair of magnetic absorbing assemblies 72, 73 using permanent magnet of iron material or the like being fixed with a space 78 provided between them inside the outer frame 90. With this arrangement, magnetic force can be applied to or removed from the magnetic absorbing area outside the base 70 without the need of moving the permanent magnet. Provided on the magnetic absorbing assemblies 72, 73 are two pairs of magnet groups 76 and 77, respectively, the magnetic poles N and S thereof being reversed with respect to each other. Magnetic absorbing assemblies 72' and 73' which are identical to the aforesaid magnetic absorbing assemblies 72 and 73 are placed on the two pairs of magnet groups 76 and 77.

Reference numeral 79 denotes a hydraulic cylinder fixed on the outer frame 90. Fixed to a piston bar 80 of the hydraulic cylinder 79 are intermediate magnetic absorbing assemblies 74, 75 via a stainless steel auxiliary member 86, wherein the intermediate magnetic absorbing assemblies 74, 75 move in the aforesaid space 78 and move up to leave the space 78. When the intermediate magnetic absorbing assemblies 74, 75 move into the space 78 and come to a standstill in contact with the base 70, one end of the intermediate magnetic absorbing assembly 74 touches the magnetic absorbing assembly 72 and the other end touches the magnetic absorbing assembly 73.

Figure 13:
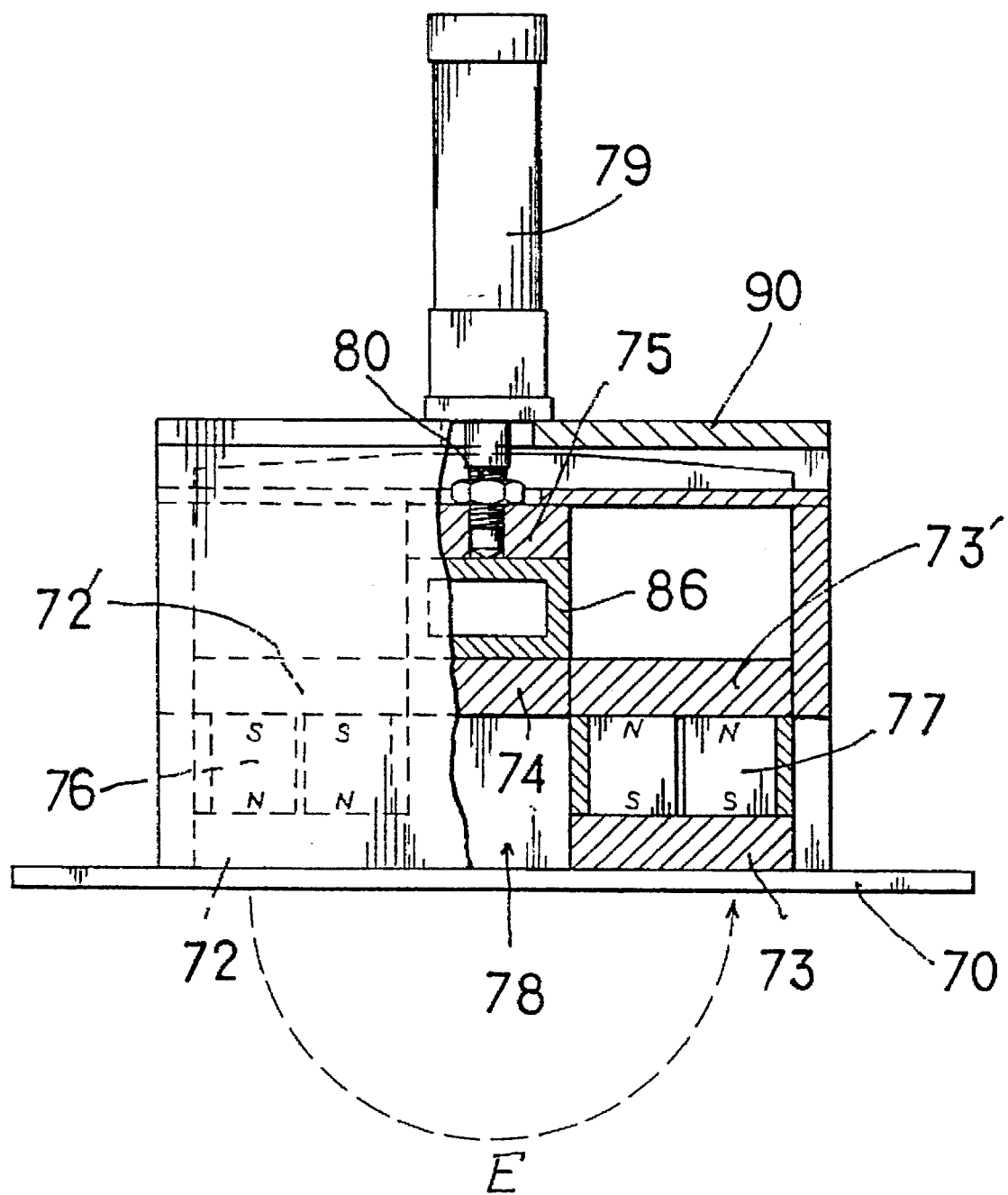
FIG. 13 is a half vertical sectional front view showing the line of magnetic force observed when the metallic material has been attracted in a fifth embodiment.
Figure 14:
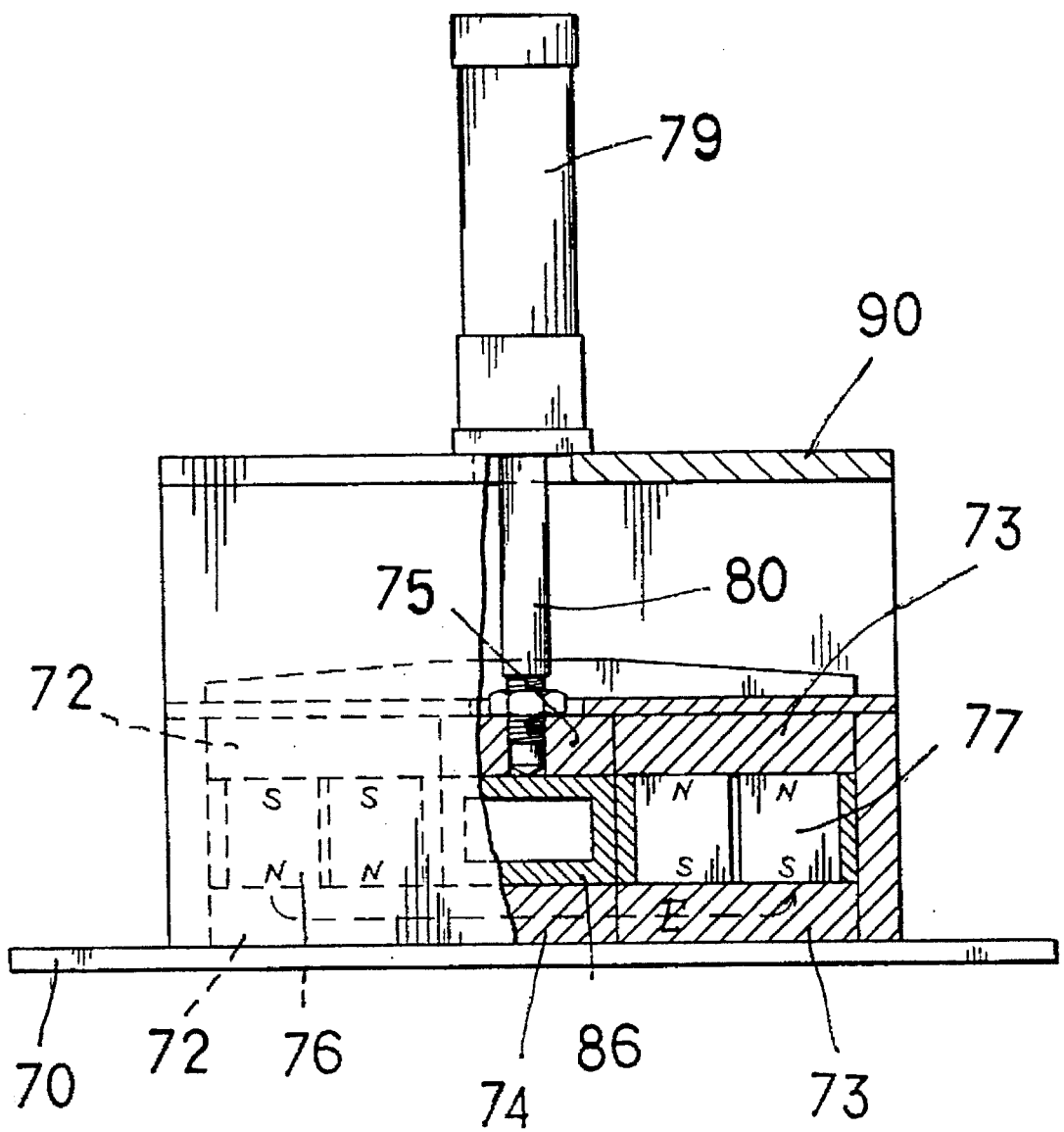
FIG. 14 is a half horizontal sectional top plan view.
Figure 15:
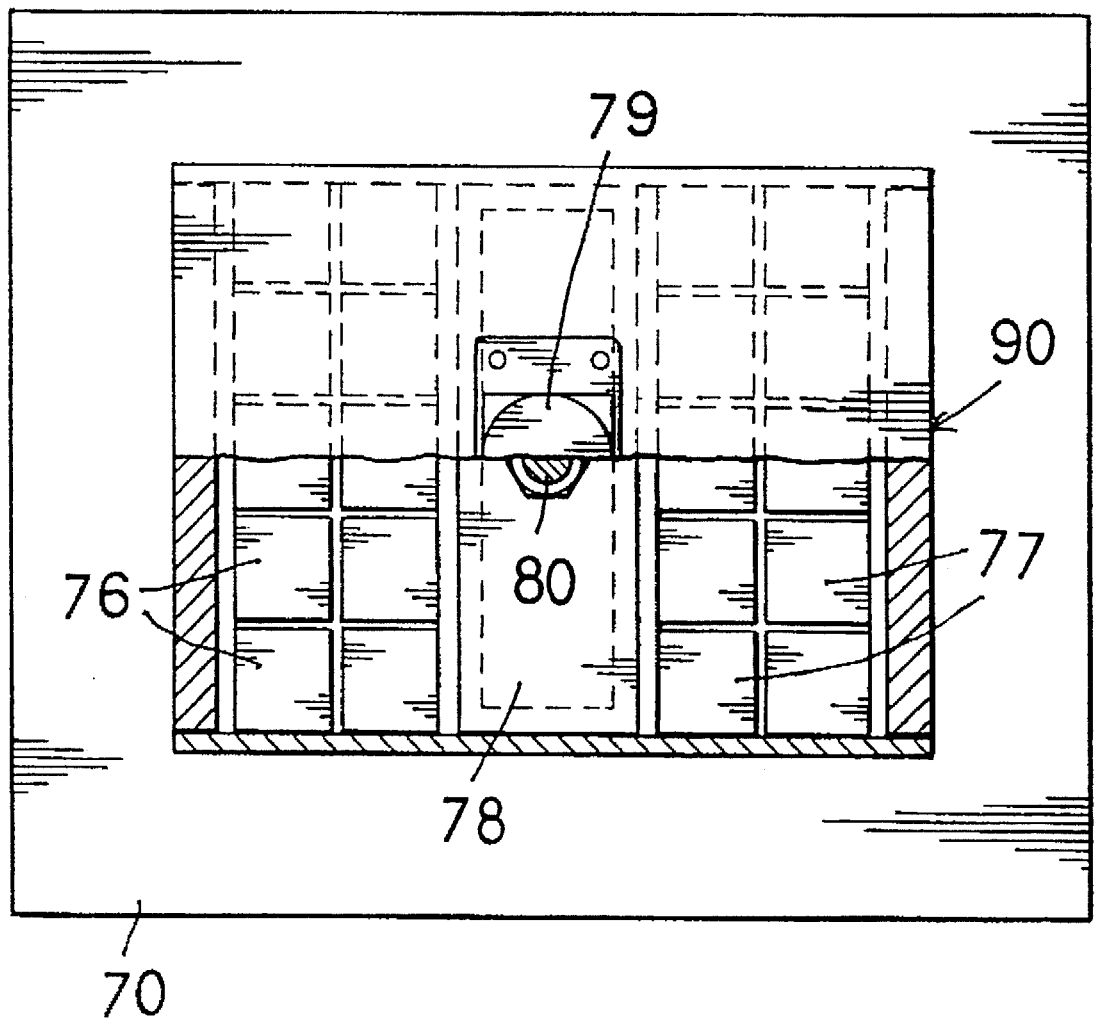
FIG. 15 is a vertical sectional side view.
Figure 16:
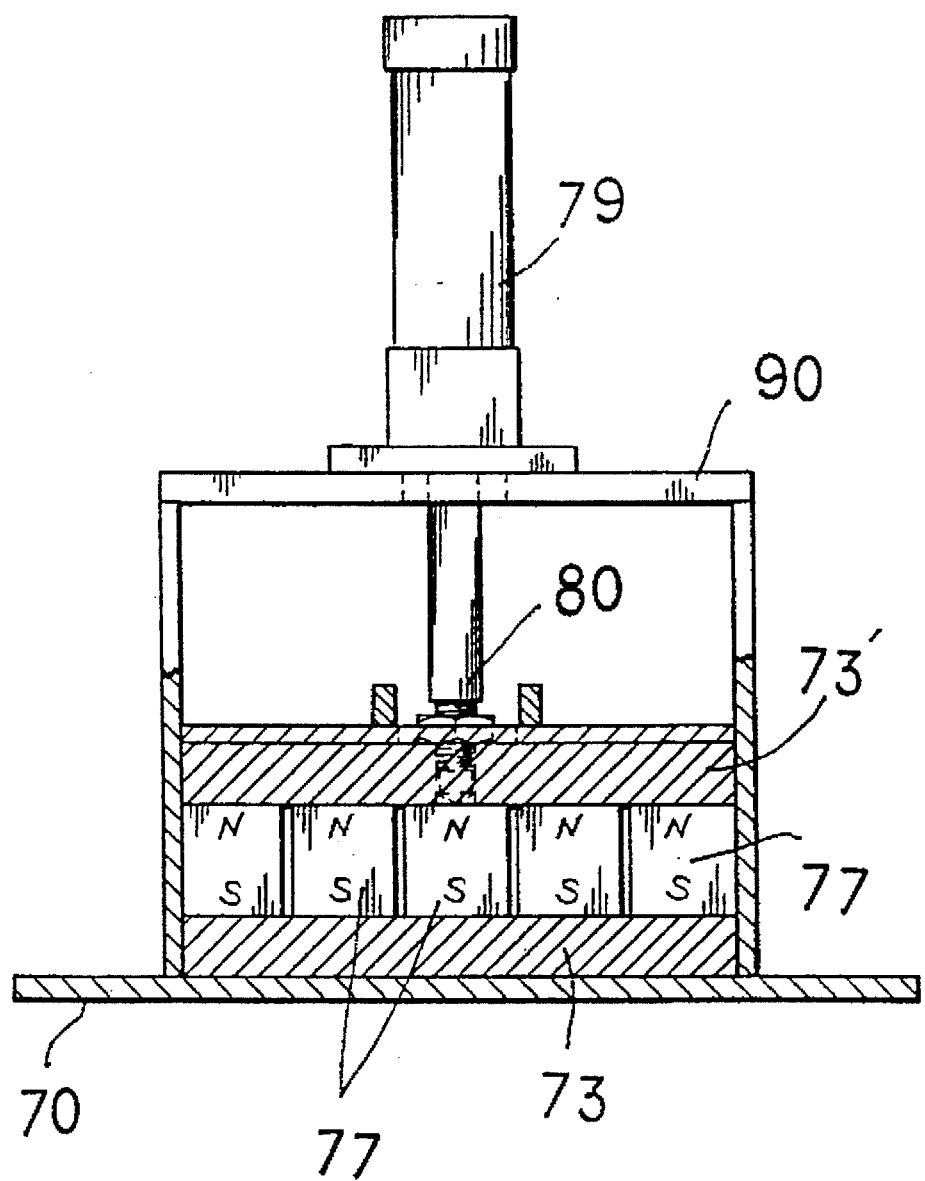
FIG. 16 is a half vertical sectional front view showing the metallic material which has been detached from the permanent magnet assembly.

Thus, without the need of moving the magnet, the line of magnetic force E is generated as shown in FIG. 13 when the intermediate magnetic absorbing assemblies 74, 75 move up away from the space 78, and the pair of the intense right and left magnetic forces causes a metallic material to be attracted to the outer side of the base 70. When the intermediate magnetic absorbing assemblies 74, 75 are in the space 78, the magnetic absorbing assemblies 72, 73 communicate with the magnetic absorbing assemblies 72', 73' through the intermediate magnetic absorbing units 74, 75; therefore, the magnetic force is not generated outside the base 70 as illustrated in FIG. 14. This means that there is no longer outward magnetic force.

According to the present invention, reinforced concrete chips and the like, which are produced when tearing down a building, can be easily and smoothly disposed of at low power by using permanent magnet, thus eliminating the need of a special power source.

The above description of the embodiments shown in the drawings is given to the structure wherein the permanent magnet is attached to the frame of the crushing arm which is installed on the distal end of the movable arm of a crusher of a construction machine and the permanent magnet is moved to generate and remove magnetic force outside the frame so as to handle the reinforced concrete chips or the like attracted to the frame. The present invention, however, can be implemented in various other forms of means wherein a permanent magnet is attached to an industrial machine such as a construction machine so as to attract metallic wastes to the machine and carry them to a predetermined location then turn off the magnetic force to release the metallic wastes from the machine. All such means are included in the scope of the present invention.

What is claimed is:

1. A metallic waste disposal device for industrial machinery for disposing of metallic waste produced during teardown of a building, including a working unit attachable to a distal end of a movable arm of a construction machine, said working unit comprising, a first frame having a bottom surface and a fixed blade, a crushing arm pivotally attached to said first frame for movement away from and toward said fixed blade, a hydraulic cylinder connected to said crushing arm for moving said crushing arm relative to the first frame, a second frame composed of a nonmagnetic assembly frame and a magnetic assembly frame joined together and installed on the bottom surface of said first frame, a permanent magnet assembly movably housed in said second frame, and connecting means joined to said crushing arm and said permanent magnet assembly for moving said permanent magnet assembly between said nonmagnetic assembly frame and said magnetic assembly frame of said second frame, as said crushing arm moves away from and toward said fixed blade.

2. A metallic waste disposal device for industrial machinery according to claim 1, wherein said permanent magnet assembly includes a plurality of permanent magnet pieces in block assembly enclosed by a metallic plate, said block assembly being movable by said connecting means with a sliding motion and a circular motion from a first area on said first frame, wherein said permanent magnet assembly generates magnetic absorption at said bottom surface, to a second area on said first frame that eliminates magnetic absorption by said permanent magnet assembly at said bottom surface.

3. A metallic waste disposal device for industrial machinery for disposing of metallic waste produced during teardown of a building, including a working unit attachable to a distal end of a movable arm of a construction machine, said working unit comprising, a first frame having a bottom surface with a magnetic absorbing area and a fixed blade, a crushing arm pivotally attached to said first frame for movement away from and toward said fixed blade, a hydraulic cylinder connected to said crushing arm for moving said crushing arm relative to the first frame, a permanent magnet assembly movably housed in said first frame, and installed close to said bottom surface, and connecting means joined to said crushing arm and said permanent magnet assembly for moving said permanent magnet assembly in synchronization with the movement of the crushing arm in relation to said first frame from said magnetic absorbing area on said bottom surface to a predetermined position away from said magnetic absorbing area that eliminates magnetic absorption at said bottom surface.

4. A metallic waste disposal device for industrial machinery according to claim 3, including a fulcrum shaft on said first frame, and said permanent magnet assembly having opposite ends and being suspended at said opposite ends from said fulcrum shaft close to said bottom surface, said connecting means including a T-shaped extension piece joined at two points to said opposite ends of said permanent magnet assembly by a cord provided with a guide roller for each end of said permanent magnet assembly, such that the permanent magnet assembly is stabilized in a magnetic attracting area on the bottom surface of said first frame when said crushing arm is in a first position relative to the first frame and said permanent magnet assembly is moved away from said magnetic attracting area to eliminate magnetic attraction at said bottom surface when said crushing arm is in a second position relative to said first frame.

5. A metallic waste disposal device for industrial machinery for disposing of metallic waste produced during teardown of a building, including a working unit attachable to a distal end of a movable arm of a construction machine, said working unit comprising, a first frame having a bottom surface and a fixed blade, a crushing arm pivotally attached to said first frame for movement away from and toward said fixed blade, a hydraulic cylinder connected to said crushing arm for moving said crushing arm relative to said first frame, a permanent magnet assembly in said first frame, including two magnet groups with NS poles thereof reversed from each other and fixed on a base, said magnetic groups being spaced from each other and enclosed by a top magnetic absorbing member and a bottom magnetic absorbing member, a movable intermediate magnetic absorbing member being provided between said two magnet groups for up and down movement in the space between said magnet groups, said movable intermediate magnetic absorbing member having magnetic absorbing sections and a nonmagnetic section, said intermediate magnetic absorbing member having a first retracted position from said space between said magnet groups to establish magnetic absorption at said bottom surface, and a second protracted position in said space wherein the magnetic absorbing sections of said movable member align with the top and bottom magnetic absorbing members of said magnet groups to eliminate magnetic absorption at said bottom surface.

* * * * *